UNITED STATES PATENT OFFICE.

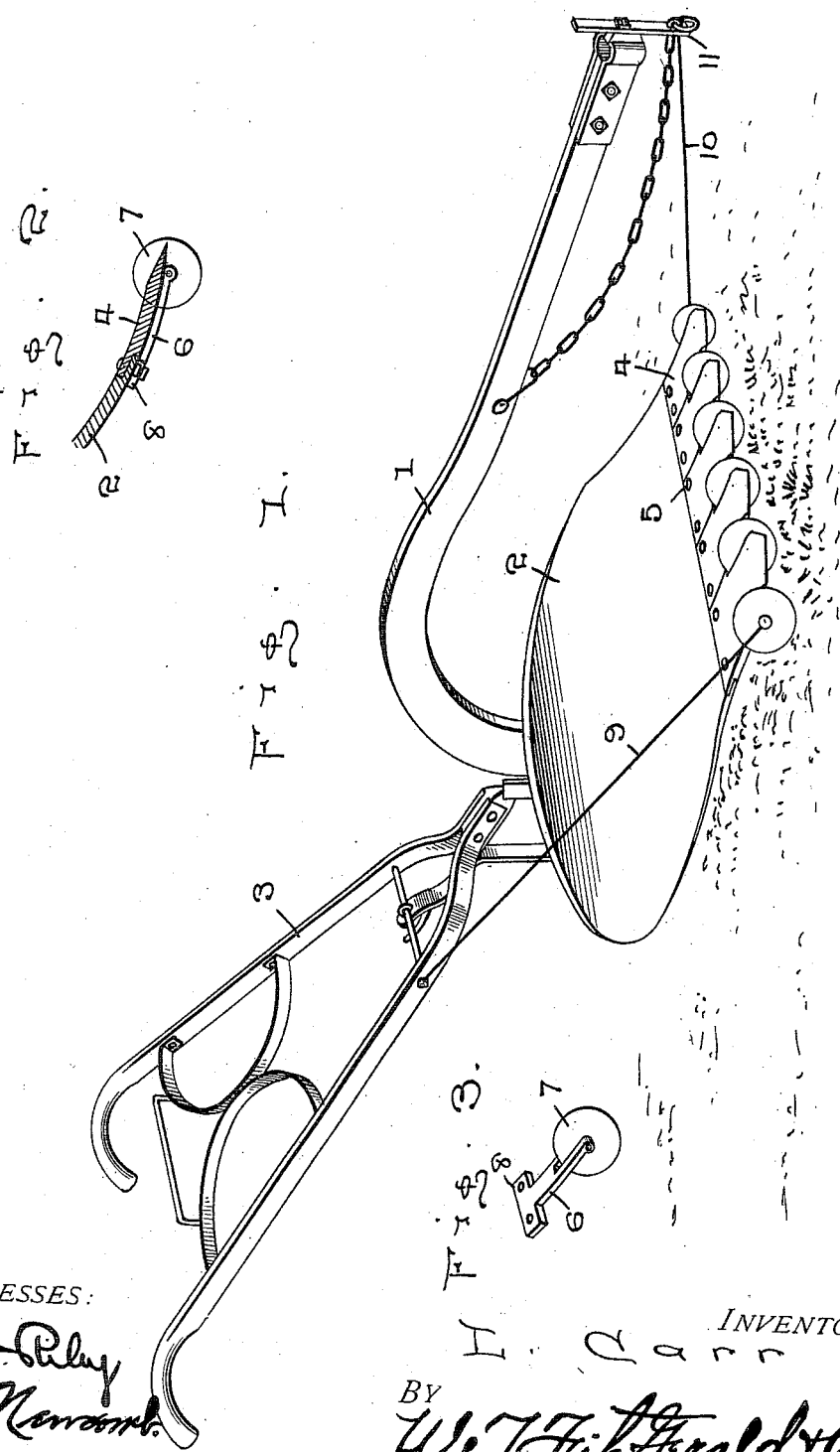

LAURENCE CARR, OF OAKLAND, CALIFORNIA.

PLOW.

982,935. Specification of Letters Patent. Patented Jan. 31, 1911.

Application filed September 27, 1910. Serial No. 584,076.

*To all whom it may concern:*

Be it known that I, LAURENCE CARR, a citizen of the United States, residing at Oakland, in the county of Alameda and State of California, have invented certain new and useful Improvements in Plows; and I do hereby declare the following to be a full, clear, and exact description of the invention, such as will enable others skilled in the art to which it appertains to make and use the same.

My invention relates to new and useful improvements in plows and more particularly to that class known as breaking plows and my object is to provide means for cutting the soil into strips in advance of the mold board.

A further object is to provide means for attaching the cutting devices to the mold board, and, A further object is to provide a plurality of shear sections and attach the same to the mold board.

Other objects and advantages will be hereinafter referred to and more particularly pointed out in the specification and claims.

In the accompanying drawings which are made a part of this application, Figure 1 is a perspective view of the plow ready for use. Fig. 2 is a detail sectional view through the lower portion of the mold board and parts attached thereto, and, Fig. 3 is a perspective view of one of the cutting disks removed from the plow.

Referring to the drawings in which similar reference numerals designate corresponding parts throughout the several views, 1 indicates the beam of the plow, to which is attached the usual or any preferred form of mold board 2 and 3 indicates handles, which are attached in the usual or any preferred manner to the plow.

Instead of attaching the usual form of shear or point to the lower edge of the mold board, I provide a plurality of shear sections 4, which are attached to the mold board in any preferred manner, as by means of bolts 5, said bolts having their heads countersunk so as to rest smoothly with the upper face of the shear sections.

Extending forwardly from the lower edge of the mold board 2 are a plurality of shanks 6, the outer ends of said shanks being bifurcated to receive cutting disks 7, said disks being rotatably mounted in the shanks.

The inner ends of the shanks are provided with T heads 8, through which the bolts 5 extend and by means of which the shanks are secured to the mold board.

The disks 7 extend between the outer ends of the shear sections and project forwardly thereof, whereby the soil will be cut into strips as the plow passes through the soil, thus partially pulverizing the soil as it is turned over by the plow.

If desired, the two disks at the opposite edges of the series of shear sections may be provided with brace rods 9 and 10, the rod 9 extending rearwardly and into engagement with one of the handles, while the rod 10 extends forwardly and into engagement with the clevis 11 at the forward end of the plow beam.

By cutting the soil in strips before it reaches the mold board, it will be seen that the soil can be more readily turned by the mold board and the draft of the plow will be greatly lessened.

It will further be seen that any one of the shear sections or disks can be removed when it is desired to renew the same or for sharpening purposes.

What I claim is:—

1. In a plow construction, the combination with a mold board, of shear sections attached to said mold board and cutting disks carried by said mold board and projecting between and forwardly of the ends of the shear sections.

2. In a plow construction, the combination with a mold board, of a plurality of shear sections removably secured thereto, a plurality of shanks attached to said mold board and extending forwardly therefrom, the forward ends of said shanks being bifurcated and cutting disks carried between said bifurcated ends and extending forwardly of said shear sections.

3. In a plow construction, the combination with a mold board, of a plurality of shear sections, bolts adapted to secure said shear sections to the mold board, a plurality of shanks having T heads at one end, through which said bolts extend and cutting disks carried at the opposite ends of the shanks, said disks extending between and forwardly of the shear sections.

In testimony whereof I have signed my name to this specification in the presence of two subscribing witnesses.

LAURENCE CARR.

Witnesses:
C. A. ORKER,
WM. BOTTCHER.